`United States Patent` [19]

Binderman et al.

[11] Patent Number: 4,803,016

[45] Date of Patent: Feb. 7, 1989

[54] METHOD OF DEOILING CRUDE LECITHIN

[75] Inventors: Melvin D. Binderman, Gaithersburg, Md.; Joseph N. Casey, Ft. Wayne, Ind.

[73] Assignee: Central Soya Company, Inc., Fort Wayne, Ind.

[21] Appl. No.: 154,987

[22] Filed: Feb. 11, 1988

Related U.S. Application Data

[63] Continuation-in-part of Ser. No. 897,288, Aug. 8, 1986, abandoned, which is a continuation-in-part of Ser. No. 724,321, Apr. 17, 1985, abandoned.

[51] Int. Cl.$^4$ ................................................ C07F 9/10
[52] U.S. Cl. .................................................... 260/403
[58] Field of Search .............................. 260/403, 428.5

[56] References Cited

U.S. PATENT DOCUMENTS 2,373,686 4/1945 Julian et al. ......................... 260/403
3,047,597 7/1962 Pardun .................................. 260/403
3,365,440 1/1968 Circle et al. ...................... 260/123.5
3,440,055 4/1969 Cleary et al. ........................ 260/403

OTHER PUBLICATIONS

Perry, "Chem. Engin. Handbook", 5th Ed. McGraw-Hill (1973), pp. 19.3–19.6 and 11.17 to 11.18.

Primary Examiner—Anton H. Sutto
Attorney, Agent, or Firm—Tilton, Fallon, Lungmus & Chestnut

[57] ABSTRACT

A method for deoiling crude lecithin which includes pretreating crude lecithin with from about 5% to about 20% acetone to control viscosity variability and to facilitate breakup of solids during extraction, introducing the thus pretreated lecithin into the upper part of a contacting chamber under conditions of agitation but without flow constriction at essentially atmospheric pressure, thereafter flowing the lecithin in continuous, countercurrent relation to acetone at a rate of 3 to 10 parts acetone to one part lecithin to provide a refined lecithin having an Acetone Insolubles content in the range of about 94% to about 99.9%.

8 Claims, 1 Drawing Sheet

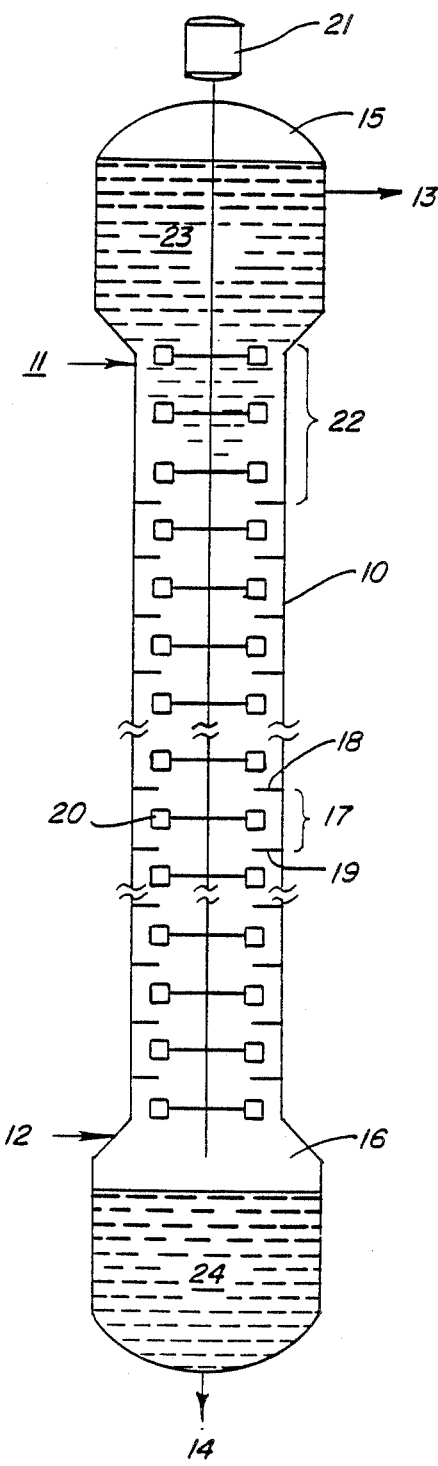

METHOD OF DEOILING CRUDE LECITHIN

This application is a continuation-in-part of our copending application Ser. No. 897,288 filed Aug. 8, 1986 which was a continuation-in-part of our copending application Ser. No. 724,321, filed Apr. 17, 1985, now abandoned.

BACKGROUND AND SUMMARY OF INVENTION

This invention relates to a method for deoiling crude lecithin and, more particularly, to a method in which the lecithin and the acetone solvent are flowed in continuous counter-current relation.

The lecithin deoiling process requires large volumes of acetone to achieve targeted oil removal. With such quantities of acetone in process, a large inventory of acetone must be maintained. Separation of the oil-bearing acetone from the deoiled lecithin and subsequent purification of the acetone is energy intensive and expensive to accomplish. The inefficiency of the historic batch-type deoiling is manifested by high solvent usage and high solvent recovery/energy costs. For example, the acetone/lecithin ratios used in current batch extraction of crude lecithin are in the range of 15:1 to 20:1. Illustrative of the prior art batch style processing is U.S. Pat. No. 3,047,597.

By the term "crude lecithin" we not only mean dry natural lecithin derived from degumming of crude soybean oil but also chemically modified lecithins such as crude lecithins which have been hydroxylated and/or acylated.

According to the invention, much lower ratios are achieved, of the order of 3:1 to 10:1 with the attendant, significant savings. This is advantageously achieved through the use of (a) an acetone pretreatment and (b) a contacting column under conditions of agitation and residence time (utilizing spaced baffles) where the two reactants are flowed in continuous, counter-current relation.

The acetone pretreatment referred to above increases flowability, i.e., reduces viscosity and facilitates break-up of solids during extraction. It is advantageous to reduce the viscosity of the crude lecithin to below about 10,000 centipoise. Although not preferred, other viscosity reducing agents may be employed such as hexane, ethanol, methyl ethyl ketone, ethyl acetate and other like esters. The alternatives can reduce viscosity but are disadvantageous because they become mixed in the extractor with the acetone, thereby resulting increased solvent recovery costs.

A search of the art revealed no pertinent teachings. One reference specifically considered was Seifen, Oele, Fette, Wachse 1971, 98(12), 359-62 (Ger.). *Chemical Abstracts*, Volume 77 (1972) at 60149e describes this as a countercurrent apparatus for purification of crude lecithin by extraction with ethanol. Ethanol is not a solvent used in deoiling lecithin because the recoveries are generally in the 50-70% range which is below the broad acceptable range of commercial production, viz., 70-99.9%, the general range of 90-99.9% and the currently utilized range of 94 to 99.9%. The ethanol extraction is normally employed to remove selectively the phosphatidyl-choline component so as to achieve a specific type of lecithin, and not for deoiling. Moreover, the use of countercurrent procedures in connection with soybean processing is well known—see for example, co-owned U.S. Pat. No. 3,365,440. The invention is described in conjunction with an illustrative embodiment and examples in the ensuing specification and the drawing features a schematic representation of a tower or contacting column useful in the practice of the invention.

DETAILED DESCRIPTION

In the drawing, the numeral 10 designates generally a vertical column. On the left side of the column 10 an upper inlet 11 is provided for introducing pretreated crude lecithin, i.e., the lecithin has been previously treated with 5-20% acetone by weight to control viscosity variability and to facilitate breakup of solids during the extraction—as by an in-line mixer before the lecithin is introduced into the column. In any event, the term crude lecithin as employed herein contemplates crude lecithin including the previously referred to chemically modified lecithin as well as those combined prior to introduction with some acetone or other viscosity reducing agent.

A second inlet 12 is provided adjaent the lower portion of the column 10 for the introduction of acetone. Two outlets 13, 14 are provided. The upper outlet 13 is located immediately adjacent the top of the column and just below the liquid level 15 in the column. This removes the miscella to solvent recovery apparatus (not shown).

The lower outlet 14 is at the bottom of the column and below the slurry-solvent interface 16. This permits removal of the lecithin-containing slurry to separation system apparatus (also not shown).

The bulk of the column is made up of mixing compartments 17—one of which is designated at the right central portion of the drawing. Each compartment includes an upper and lower baffle 18, 19 respectively in the form of an annular ring. The open area of each annular baffle (defined by the inner diameter) can range between 20% and 40% of the total area defined by the outside diameter for maximum extraction efficiency.

Interposed in each compartment are one or more agitators 20 schematically represented in the drawing with the various agitators being driven by a motor 21 provided at the top of the column 10. For any compartment, the agitator(s) may be designed to yield specific mixing intensities which may be different from those in other compartments.

This much of the column can be purchased commercially and the examples 1-3, 5 and 6 given hereinafter were run on a laboratory-type Kuehni E60 extraction column manufactured by Kuehni A. F. of Muhlebachweg, Switzerland. Examples 4 and 7 represent tests conducted on an Oldshue-Rushton 6-inch Pilot Plant extraction column manufactured by Mixing Equipment Co., Inc. of Rochester, N.Y.

In the practice of the invention, we have found it advantageous to provide a feed section 22 which is equipped with agitators but without baffles. We have found that lack of the turbine-like agitators and/or the presence of baffles in the feed section 22 promotes clogging.

Operation Generally

Lecithin is treated with 5-20% acetone to facilitate break-up of solids during extraction, and to increase flowability. The treated lecithin is introduced at 11 near the top of a vertical, cylindrical, column containing multiple compartments. The lecithin feed compartment 22 contains one or more turbine agitators.

Being of higher specific gravity than acetone, the treated lecithin flows downward through the column while being broken up into small, solid particles by the agitators 20. Below the lecithin feed compartment 22, the lecithin particles are further extracted in multiple compartments bounded by circular baffles 18, 19 and containing one or more turbine-type agitators 20.

The extracted lecithin solids are removed as a slurry from the bottom 14 of the column with a pump. Acetone is introduced at 12 near the bottom of the column, flows upward through the column making intimate contact with lecithin, then exits the column top at 13. As the acetone flows through the column, it continuously extracts oil and other acetone-solubles from the lecithin solids.

The efficiency of this continuous, counter-current extraction is superior to conventional batch extractions with efficiency related to acetone/lecithin ratio. After removal of the solids from the column at 14 as a slurry, they are pumped to a centrifuge, or filter, where they are partially desolventized. The resulting cake is then completely desolventized in an industrial food-grade dryer to yield food-grade, oil-free phosphatides commercially known as lecithin granules.

The practice of the invention can be better understood from a consideration of specific examples.

EXAMPLE 1

A feed stream containing 15.4% acetone (wt/wt) and 84.6% lecithin (72.7% AI) at 70° F. was introduced to the column Feed Section at the rate of 0.066 lbs./min. Acetone was introduced to the bottom of the column at 64° F. and a flow rate of 1.48 lbs./min. The turbines were spinning at 350 rpm. Deoiled solids slurry containing 3.85% solids (as bone dry, oil-free solids), 0.24% oil and 95.91% acetone were removed from the bottom at a rate of 1.247 lbs/min. The solids were approximately 94.1% AI. Acetone miscella containing 4.82% oil (wt/wt) overflowed from the top of the column at a rate of 0.311 lbs./min. The acetone/lecithin ratio inside the column was approximately 4.7:1 (by weight).

The resultant 94.1% Acetone Insolubles was just under the minimum specification of 95% AI currently applicable to "oil free" phosphatides as marketed by Central Soya Company, Inc. under the designation Centrolex® R. Such oil free soybean lecithin is made by the batch process utilizing acetone/lecithin ratios in the range of 15:1 to 20:1. The Acetone Insolubles are all determined by Central Soya Company Analytical Method 140 which is based on AOCS Ja 4-46.

With a slightly higher acetone/lecithin ratio, a significant increase in AI was achieved as seen in the following example.

EXAMPLE 2

A feed stream containing 15.4% acetone and 84.6% lecithin (71.7% AI) at room temperature was introduced to the column Feed Section at the rate of 0.117 lbs./min. Acetone was introduced to the bottom of the column at room temperature and a flow rate of 1.80 lbs./min. The turbines were spinning at 350 rpm. Deoiled solids slurry containing 6.72% solids (as bone dry, oil-free solids), trace % oil and 93.28% acetone were removed from the bottom at a rate of 1.057 lbs./min. The solids were approximately 99.8% AI. Acetone miscella containing 3.26% oil overflowed from the top of the column at a rate of 0.860 lbs./min. The acetone/lecithin ratio inside the column was approximately 8.6:1 (by weight).

To determine the effect of a flow ratio intermediate to those of Examples 1 and 2, another test was run—with slightly higher entering temperature and faster turbine speed.

EXAMPLE 3

A feed stream containing 15.0% acetone and 85.0% lecithin (72.0% AI) at 80° F. was introduced to the column Feed Section at the rate of 0.080 lbs./min. Acetone was introduced to the bottom of the column at 64° F. and a flow rate of 1.52 lbs./min. The turbines were spinning at 525 rpm. Deoiled solids slurry containing 4.38% solids (as bone dry, oil-free solids), 0.15% oil and 95.44% acetone were removed from the bottom at a rate of 1.118 lbs./min. The solids were approximately 96.1% AI. Acetone miscella containing 3.53% oil overflowed from the top of the column at a rate of 0.482 lbs/min. The acetone/lecithin ratio inside the column was approximately 7.0:1 (by weight).

It will be noted that in each of the foregoing examples that the crude lecithin was treated with about 15% acetone—as a pretreatment before introduction into the column. Initially, this was discovered to be necessary because the licithin was too viscous to be pumped from cold storage tanks. It was subsequently discovered that the pretreatment was advantageous in facilitating break-up of solids during extraction. For example, the viscosity of one batch of crude lecithin varied as follows with the amount of acetone in the pretreatment, the measurements being taken at room temperature:

TABLE 1

| % Acetone | Viscosity (centipoise) |
|---|---|
| 0.0 | Too plastic to measure |
| 5.0 | 66,000 |
| 10.0 | 7,600 |
| 15.0 | 1,500 |
| 17.5 | 440 |
| 20.0 | Partially deoiled solids already appearing |

There is great variability in the viscosity of crude lecithin. For example, another batch tested as follows also at room temperature:

TABLE 2

| % Acetone | Viscosity (centipoise) |
|---|---|
| 0.0 | 19,500 |
| 5.0 | 4,100 |
| 10.0 | 1,512 |
| 15.0 | 410 |
| 20.0 | 180 |

To test the viscosity sensitivity of crude lecithin, another test was run—without acetone treatment but using higher temperature of reactant.

EXAMPLE 4

A feed stream containing 100% lecithin (68.0% AI) at 100° F. was introduced into a modified form of column having a sparge ring at the top of the feed compartment 22 at the rate of 0.219 lbs./min. Acetone was introduced to the bottom of the column at 75° F. and at a flow rate of 1.629 lbs./min. Deoiled solids slurry containing 25.82% solids (as bone dry, oil-free solids), 2.77% oil and 71.41% acetone were removed from the bottom at a rate of 0.577 lbs./min. The solids were approximately 92.5% AI. Acetone miscella containing 4.25% oil overflowed from the top of the column at a rate of 1.271 lbs./min. The acetone/lecithin ratio inside the column was approximately 5.6:1 (by weight).

Normally however, the extraction is carried out at room temperature—about 70° F. It will be noted that at the higher temperature the AI was not up to 95%—this due to slower break-up of the lecithin in the column.

In all four examples, the column was configured from top to bottom as follows. The uppermost section 23 functions as a settler and contains neither agitators nor baffles. Immediately therebelow, the feed section 22 is equipped with agitators but is baffle-less. Immediately below the feed section 22 is the mixing section which can contain from 10 to 30 or more compartments depending upon the configuration of the column, residence time, flow rates, etc. Each compartment 17 is equipped with an agitator 20 and baffles 18, 19. It will be appreciated that the upper baffle of one compartment serves as the lower baffle of the compartment immediately thereabove. Lastly, the bottom of the column at 24 is another settling section, again without agitators or baffles.

The significance of not removing the baffles from the feed section can be appreciated from the following example:

EXAMPLE 5

A feed stream containing 15.4% acetone and 84.6% lecithin (72.7% AI) at room temperature was introduced to the column Feed Section at the rate of 0.20 lbs./min. Acetone was introduced to the bottom of the column at room temperature and a flow of 0.96 lbs./min. The turbines were spinning at approximately 400 rpm. The Feed Section contained the full complement of baffles in this example. Within a minute of the start of acetone and lecithin flow, it became apparent that the Feed Section was beginning to clog with crude lecithin which would not break-up in the Feed Section. The run was terminated within the next minute or so due to the clogging.

The operation with all baffles removed is seen in Example 6:

EXAMPLE 6

In this example, all the baffles were removed from the column. Thereafter, a feed stream containing 15.4% acetone and 84.6% lecithin (72.7% AI) at room temperature was introduced to the column Feed Section at the rate of 0.08 lbs./min. Acetone was introduced to the bottom of the column at room temperature at a flow rate of 1.53 lbs./min. The turbines were spinning at 350 rpm. Deoiled solids slurry was removed from the bottom of the column. Acetone miscella containing 0.55% oil overflowed from the top of the column. The deoiled solids had 92.7% AI which was unacceptable according to current standards.

The following example deals with a chemically modified lecithin. This was performed subsequent to the tests of Examples 1-6 and on the Oldshue-Ruston 6" Pilot Plant extraction column used in Example 4. However, the column had been donated by Mixing Equipment Company to Pennsylvania State University so the column had its full complement of baffles. As expected, clogging ultimately occurred. But before this happened, the data was collected which showed that the inventive procedure had potential merit.

EXAMPLE 7

A feed stream containing 13.4% acetone (wt/wt) and 86.6% hydroxylated and acylated lecithin (61.8% AI) at room temperature was introduced to the column Feed Section at the rate of 0.046 gals./min. Acetone was introduced to the bottom of the column at room temperature at a flow rate of 0.268 gals./min. The turbines were spinning at 300 rpm. The solids collected from the bottom of the column were approximately 96% AI. Acetone miscella containing 4.3% oil (wt/wt) overflowed from the top of the column. The acetone/lecithin ratio inside the column was approximately 5.5:1 (by weight).

Ranges

The Acetone Insolubles (AI) in the finished product can range from 70% to 99.9%. The lower limit has no critical nature except to show the lower commercially feasible limit of operation. As indicated previously, commercial operation can require that the AI range be 90-99.9% but currently the range is 94 to 99.9%.

The acetone/lecithin ratio is in the range of about 3:1-10:1. This range of ratios represents a significant reduction in the amount of solvent used during extraction. The acetone/lecithin ratios used in current batch production are of the order of 15:1-20:1. The pretreatment with acetone to achieve proper viscosity (below about 10,000 centipoise) at room temperature and to facilitate breakup of solids during extraction should employ from about 5% to about 20% acetone on a weight/weight basis, viz., from about 95% to about 80% crude lecithin in the feed.

Summarizing the results of experimentation with the invention, we find the following:

1. The ratio by weight of acetone flow rate to lecithin flow rate must be greater than 3 or clogging will be promoted;

2. When all other operating parameters are held constant, increasing the baffle ID will reduce the residence time of solids, causing a reduction of the product AI, and a reduction of the solids holdup of the column;

3. Fluctuations in the miscella overflow rate when all operating parameters remain unchanged, is due to fluctuations in the concentration of solids in the bottom slurry;

4. Increased agitator rpm causes increased product AI and increases the solids holdup in the column, thereby increasing their residence time in the column;

5. Increased lecithin and acetone feed temperatures (105° F. and 86° F. respectively) did not increase product AI over extraction at room temperature (65°-75° F.).

While in the foregoing specification a detailed description of the invention has been set down for the purpose of explanation, many variations in the details hereingiven may be made by those skilled in the art without departing from the spirit and scope of the invention.

We claim:

1. A method for the acetone deoiling of crude lecithin comprising providing a vertically-extending column having in progression from the top: an upper settling and removal section, a lecithin feed section, a contacting section, an acetone feed section and a bottom settling and removal section, said lecithin feed section and contacting section being equipped with vertically spaced apart agitators, the agitators only in said contacting section being separated by vertically-spaced apart, aperture-equipped annular baffles wherein the open area of each annular baffle is from about 20% to about 40% of the outside diameter of the baffle, treating said lecithin with from about 5% to about 20% acetone to facilitate break-up of solids during extraction and to increase flowability, introducing said treated lecithin into said feed section while introducing acetone into said acetone feed section, said lecithin introduction being under conditions of agitation but without flow constriction and at essentially atmospheric pressure, thereafter flowing said lecithin in continuous, countercurrent relation to acetone at a rate of 3 to 10 parts acetone to one part lecithin by weight under conditions of agitation and flow constriction to provide a refined lecithin having an Acetone Insolubles content in the range of about 94% to about 99.9%.

2. A method for deoiling crude lecithin comprising treating said lecithin with from about 5% to about 20% acetone to facilitate break-up of solids during extraction and to increase flowability, introducing said treated lecithin into the upper part of a contacting chamber under conditions of agitation but without flow constriction at essentially atmospheric pressure, thereafter flowing said lecithin in continuous, countercurrent relation to acetone at a rate of 3 to 10 parts acetone to one part lecithin by weight under conditions of agitation and flow constriction to provide a refined lecithin having an Acetone Insolubles content in the range of about 70% to about 99.9%.

3. The method of claim 2 in which the viscosity of the treated lecithin is below about 10,000 centipoise.

4. The method of claim 2 in which said crude lecithin is a member selected from the class consisting of dry natural lecithin, hydroxylated crude lecithin, acylated crude lecithin, and hydroxylated-acylated crude lecithin.

5. The method of claim 2 in which said Acetone Insolubles Content is above about 90%.

6. The method of claim 2 in which said Acetone Insolubles Content is above about 94%.

7. A method for deoiling crude lecithin comprising introducing at room temperature crude lecithin which had previously been treated with from about 5% to about 20% acetone to facilitate break-up of solids during extraction and to increase flowability by reducing the viscosity to below about 10,000 centipoise into the upper part of a contacting chamber under conditions of agitation but without flow constriction at essentially atmospheric pressure, thereafter flowing said lecithin in continuous, countercurrent relation to acetone at a rate of 3 to 10 parts acetone to one part lecithin by weight under conditions of agitation and flow constriction to provide a refined lecithin having an Acetone Insolubles content in the range of about 90% to about 99.9%.

8. The method of claim 7 in which the Acetone Insolubles Content is above about 94%.

* * * * *